United States Patent [19]

McKeigue et al.

[11] Patent Number: 5,624,733
[45] Date of Patent: Apr. 29, 1997

[54] STRUCTURED PACKING

[75] Inventors: Kevin McKeigue, New York, N.Y.;
Venkat Natarajan, Scotch Plains, N.J.

[73] Assignee: The BOC Group, Inc., New Providence, N.J.

[21] Appl. No.: 495,159

[22] Filed: Jun. 27, 1995

[51] Int. Cl.$^6$ .................................. B01F 3/04; B32B 3/28
[52] U.S. Cl. .......................... 428/182; 428/167; 428/184; 428/188; 261/112.2
[58] Field of Search ..................................... 428/182, 212, 428/174, 167, 131, 136, 137, 184, 188; 261/112.2, DIG. 11

[56] References Cited

U.S. PATENT DOCUMENTS

| | | | |
|---|---|---|---|
| 4,579,693 | 4/1986 | Wigley | 428/184 |
| 4,604,247 | 8/1986 | Chen et al. | 261/112.2 |
| 5,185,106 | 2/1993 | Chen et al. | 261/112.2 |
| 5,188,773 | 2/1993 | Chen et al. | 261/112.2 |

*Primary Examiner*—Donald Loney
*Attorney, Agent, or Firm*—David M. Rosenblum; Larry R. Cassett

[57] ABSTRACT

A structured packing for producing intimate contact between liquid and vapor phases formed of a plurality of juxtaposed sheets through which the liquid phase descends as a film. The sheets have corrugations to define flow channels through the sheets for the vapor phase to ascend through the structured packing and contact the liquid phase. The sheets have a plurality of elongated projections, situated on one or both sides of each of the flow chapels and/or each of the sheets. The projections are configured and oriented to produce turbulent mixing in the vapor phase as it ascends though the packing. This turbulence inhibits the formation of a concentration gradients within the vapor phase in directions normal to the walls of the flow chapels. The elongated projections are spaced apart from one another so that the turbulence and the vapor phase subsides between the elongated projections.

10 Claims, 3 Drawing Sheets

STRUCTURED PACKING

BACKGROUND OF THE INVENTION

The present invention relates to a structured packing for producing intimate contact between vapor and liquid phases. More particularly, the present invention relates to such a structured packing formed of a plurality of juxtaposed sheets having corrugations to define fine flow channels. Even more particularly the present invention relates to such a structured packing in which a plurality of elongated projections are situated within the flow channels to produce turbulence in the vapor phase.

In many chemical process applications, for instance heat exchange, adsorption, distillation, it is necessary to bring liquid and vapor phases into contact with one another. Such contact is induced by various liquid-vapor contact media such as sieve plates, trays and structured packing. Structured packing has found increased use in process applications due to its predictable performance and its low pressure drop characteristics. Structured packing consists of a plurality of juxtaposed sheets having corrugations and can be obtained with various packing densities, angular relationships between the corrugations, and performance characteristics.

Structured packing is used in connection with a liquid distributor placed within a column and above the packing to distribute the liquid phase to the packing. The liquid phase descends within the structured packing as a falling film. At the same time, a vapor phase ascends in the column through vapor passages provided within the packing by the corrugations to cause intimate contact or mixing between the liquid and vapor phases.

Heat and mass transfer between the liquid and vapor phases occurs at the interface between the phases which is located close to the surface of the sheet material making up the structured packing. In the case of mass transfer, the transfer of a component from one phase to the other creates a concentration gradient in the vapor phase within each flow channel in a direction taken normal to the surface of the sheet material. As will be apparent to those skilled in the art, the rate of mass transfer between the phases will be higher when the vapor phase is of uniform concentration and will be lower once such a concentration gradient is established.

As will be discussed, the present invention provides a structured packing in which the vapor phase periodically undergoes turbulent mixing as it travels through the flow channels within the packing. This mixing inhibits the formation of concentration gradients in the vapor phase in a direction taken normal to the surface of the sheet material and thereby increases the rate of mass transfer between phases. A similar effect would be obtained in the case of heat transfer; the turbulence inhibits the formation of a temperature gradient and thereby increases the overall rate of heat transfer.

SUMMARY OF THE INVENTION

The present invention provides a structured packing for producing intimate contact between vapor and liquid phases. The structured packing comprises a plurality of juxtaposed sheets through which the liquid phase descends as a film. The sheets have corrugations to form flow channels through the sheets for the vapor phase to ascend through the structured packing and contact the liquid phase. The sheets are provided with a plurality of elongated projections. These projections arc situated on at least one side of the flow channels and on at least one side of each of the sheets. The projections are configured and oriented to produce turbulent mixing in the vapor phases it ascends. This turbulence tends to inhibit concentration gradients from arising within the vapor phase in directions normal to surfaces of the corrugations defining the flow channels. The elongated projections are spaced apart from one another so that the turbulence in the vapor phase subsides between the elongated projections.

Thus, the present invention by producing turbulence tends to produce greater mass transfer between the vapor phase and the liquid phase by inhibiting the formation of a stable concentration gradient in which some of the vapor passing through the flow channels tends not to interact with the liquid film on the surface of the packing. This will increase the performance of the packing with respect to the rate of mass transfer between the liquid and vapor phases. As can be appreciated by those skilled in the art, the production of turbulence could potentially lead to a large increase in the pressure drop in the packing and thus degrade the performance of the packing. In order to prevent such pressure drop, the spacing of the projections is carefully selected to produce a subsidence of turbulence between the projections.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
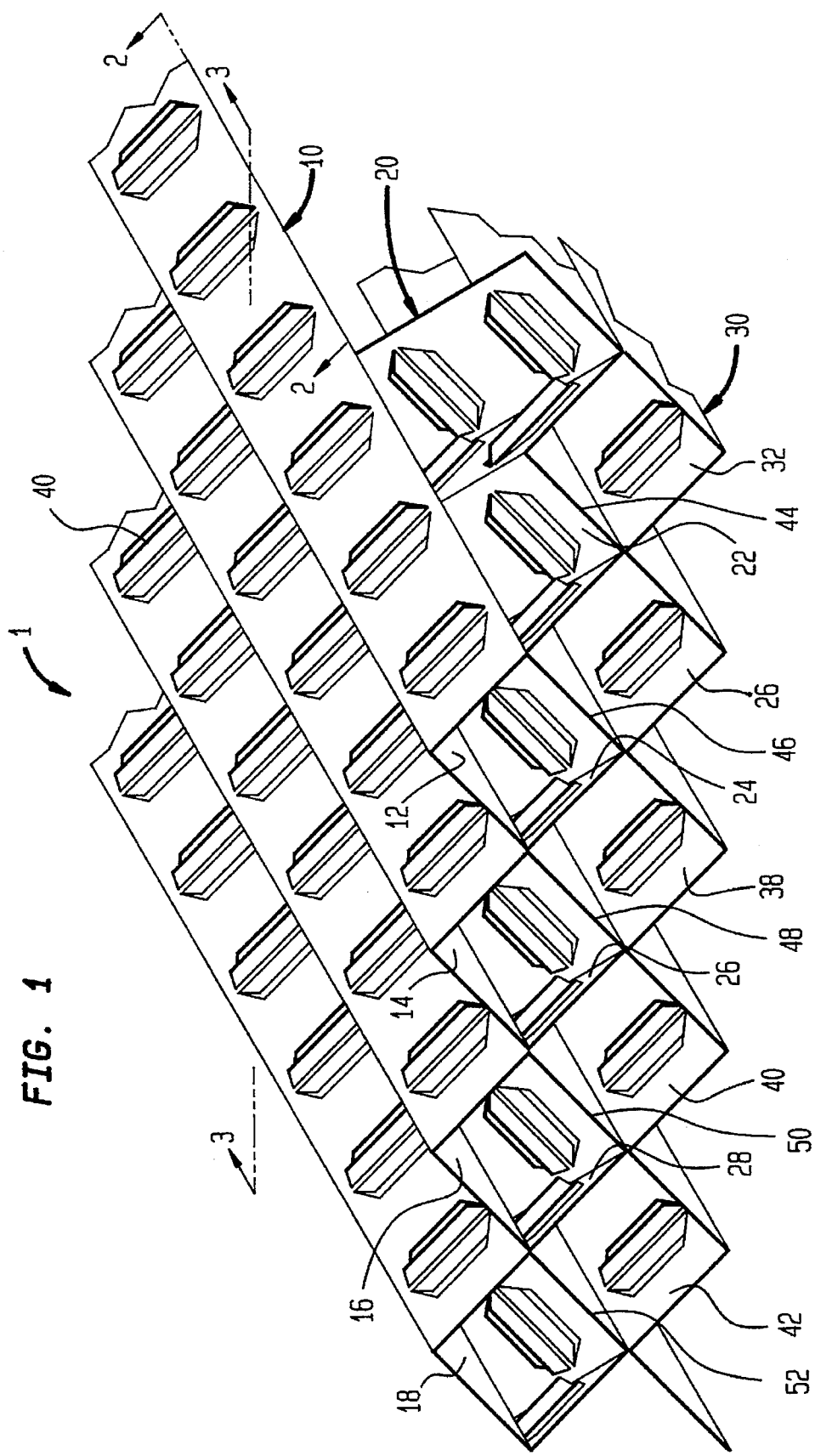
FIG. 1 is a fragmentary, perspective view of a structured packing in accordance with the present invention, which for purposes of explanation has been rotated from the vertical to the horizontal.

With reference to FIG. 1, a structured packing 1 in accordance with the present invention is illustrated. Structured packing 1 illustrates three sheets 10, 20 and 30 which are in juxtaposition. Corrugations within sheet 10 and 20 produce flow channels 12, 14, 16 and 18 of sheet 10 which are set opposite to flow channels 22, 24, 26 and 28 of sheet 20. The corrugations of sheet 30 provide flow channels 32, 36, 38, 40 and 42 which are set opposite to flow channels 44, 46, 48, 50, and 52 of sheet 20. In the illustrated embodiment, the second sheet 20 is oriented with its corrugations at an angle to those of sheets 10 and 30 so that the respective flow channels criss-cross. This criss-crossing of flow channels increases the mixing between the vapor and liquid phases.

Figure 2:
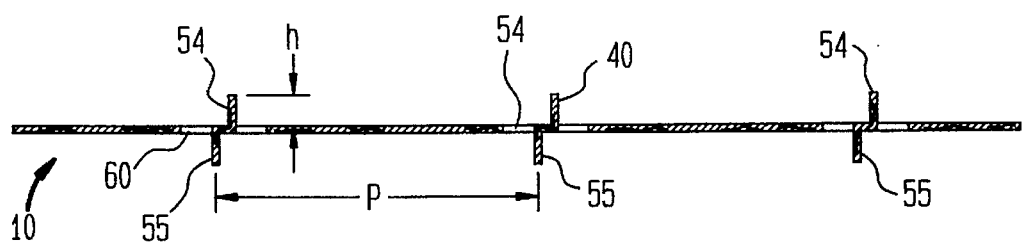
FIG. 2 is a sectional view of FIG. 1 taken along line 2—2 thereof.
Figure 3:
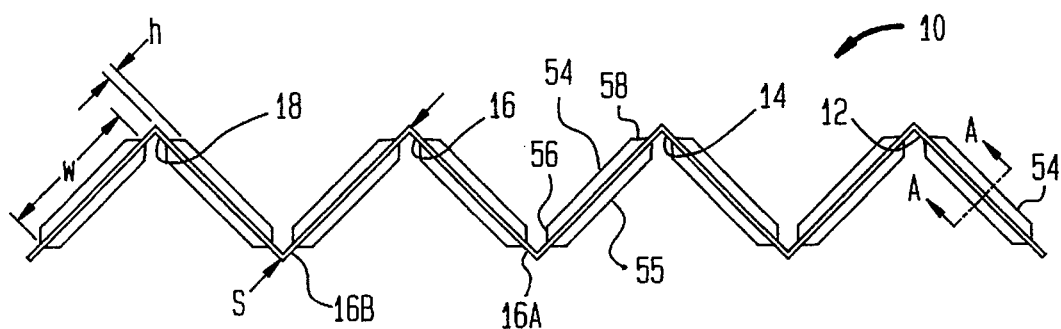
FIG. 3 is a sectional view of FIG. 1 taken along line 3—3 of FIG. 1.

With additional reference to FIGS. 2 and 3, projections 54, 55 are provided to produce turbulence in the vapor phase as it ascends the structured packing. Projections 54, 55 comprise cut out tabs bent in direction away from sheet 10, or any of the other sheets of the structured packing. Projections 54, 55 have inwardly sloping side edges, such as 56 and 58 to allow liquid film to flow between projections 54, 55. Although not illustrated, the tabs could be provided with only one side of the flow channels. For instance, flow channel 16 can be said to have sides 16A and 16B and projections 54, 55 could be provided only on side 16A and not side 16B. Alternatively or in addition to the foregoing, projections might be provided on only one side of each of the sheets. As such an embodiment of the present invention is possible which is only provided with projections 54 and not projections bent in an opposite direction such as projections 55. The advantage of such alternative embodiments would be to decrease interference between the remaining of projections 54, 55 and the descending liquid phase.

The flow channels 12-18, 22-28, 32-42, and 44-52 each have a channel dimension S. The height of projections 54, 55, designated by reference h, should preferably be in a range of between about 5% and about 20% of the channel dimension S. The projection spacing dimension, "p" should preferably be in a range of between about 2 and about 12 times the height of the projections, h. Note that since flow channels will exist on both sides of each of corrugated sheets 10, 20 and 30, so that (as viewed in the illustration) projections 54 project upwardly from the surface while projections 55 project downwardly from the surface. Openings 60 are thus formed which allow liquid to flow between the flow channels.

Figure 4:
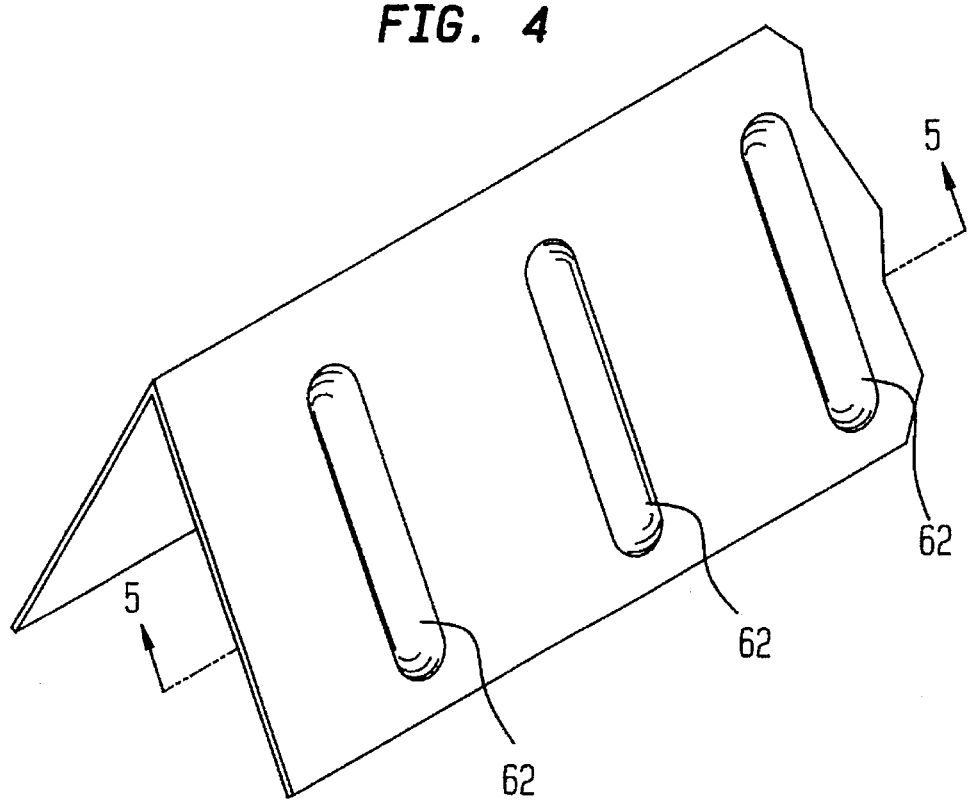
FIG. 4 is a fragmentary view of an alternative embodiment of projections to be utilized in a structured packing in accordance with the present invention.
Figure 5:
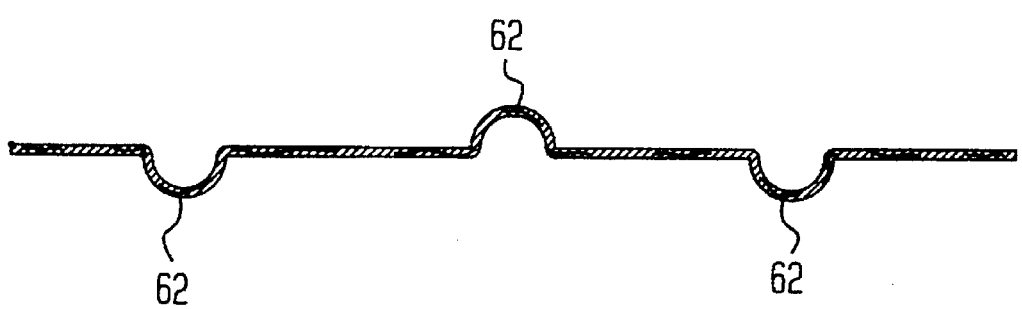
FIG. 5 is a sectional view shown along line 5—5 of FIG. 4.

With reference to FIGS. 4 and 5, a fragment of a flow channel is illustrated to show an alternative projection design. The projections of this embodiment, instead of projections 54, 55, comprise rib-like embossments 62 which alternate so as to project from both surfaces of the packing sheet.

Although not illustrated, there are still other possible designs and modifications, such as projections similar to those of projections 54, 55 but formed of tabs bent at less than right angles to the sheets. Additionally, although the projections illustrated herein are oriented in a direction parallel to the transverse dimension of the sheets, the projections could be oriented at an angle to such transverse dimension.

Additionally, although the projections illustrated herein are shown as single tabs or ribs which extend more or less across one entire wall or surface of a flow channel, groups of small tabs or ribs with intervening spaces could be used to form the turbulence producing projections. These small tabs or ribs could be angled with respect to one another, for instance in a V-like configuration, to produce a greater or lesser degree of turbulence to optimize the packing design for a particular application. In this regard, when turbulence is said to subside between projections it is understood that such phraseology means and the claims are intended to cover turbulence subsiding in the intervening spaces between such groups of tabs or ribs.

Although the present invention has been described with reference to a preferred embodiment, it will occur to those skilled in the art that numerous changes, additions and omissions may be made without departing from the spirit and scope of the present invention.

We claim:

1. A structured packing for producing intimate contact between vapor and liquid phases, said structured packing comprising:

a plurality of juxtaposed sheets through which said liquid phase descends as a film;

said sheets having corrugations to form flow channels through said sheet for said vapor phase to ascend through the structured packing and contact said liquid phase;

said sheets having a plurality of elongated projections, situated on at least one side of said flow channels and at least on one side of each of said sheets, configured and oriented to produce turbulent mixing in said vapor phase as its ascends and thereby inhibit concentration gradients from arising within the vapor phase in directions normal to surfaces of said corrugations defining said flow channels; and said elongated projections spaced apart from one another so that said turbulence in said vapor phase subsides between said elongated projections.

2. The structured packing of claim 1, wherein said sheets are fabricated from sheet metal.

3. The structured packing of claim 1, wherein said corrugations of facing sheets are angled with respect to one another.

4. The structured packing of claim 1, wherein said projections comprise cut-out tabs bent in a direction away from said sheets.

5. The structured packing of claim 4, wherein said cut-out tabs have inwardly sloping side edges.

6. The structured packing of claim 1, wherein said projections comprise rib-like embossments.

7. The structured packing of claim 1, wherein said projections are oriented in a lengthwise direction parallel to a transverse direction of said sheets.

8. The structured packing of claim 4 or claim 5 or claim 6 or claim 7, wherein said projections have a height in a height range of between about 5% and about 20% of a flow channel side and a spacing between said projections in a spacing range of between about 2 and about 12 times said height.

9. The structured packing of claim 8, wherein said sheets are fabricated from sheet metal.

10. The structured packing of claim 9, wherein said corrugations of facing sheets are angled with respect to one another.

* * * * *